United States Patent [19]

Kobayashi et al.

[11] Patent Number: 5,438,562
[45] Date of Patent: Aug. 1, 1995

[54] OPTICAL HEAD FOR RECORDING AND/OR REPRODUCING INFORMATION ON AND/OR FROM OPTO-MAGNETIC RECORD MEDIUM

[75] Inventors: Shohei Kobayashi; Yasuhiro Miyazaki; Yasuhiro Fujiwara, all of Tokyo, Japan

[73] Assignee: Olympus Optical Co., Ltd., Tokyo, Japan

[21] Appl. No.: 133,243

[22] Filed: Oct. 8, 1993

[30] Foreign Application Priority Data

| Oct. 9, 1992 | [JP] | Japan | 4-271743 |
| Jan. 19, 1993 | [JP] | Japan | 5-006699 |
| Mar. 22, 1993 | [JP] | Japan | 5-062035 |
| Apr. 27, 1993 | [JP] | Japan | 5-101204 |

[51] Int. Cl.$^6$ .............................. G11B 11/12
[52] U.S. Cl. .................... 369/110; 369/44.23
[58] Field of Search .......... 369/110, 112, 44.21–44.23; 359/636, 637, 640, 487, 494, 495; 250/201.5; 365/364, 367

[56] References Cited

FOREIGN PATENT DOCUMENTS

| 62-172537 | 7/1987 | Japan | 369/44.23 |
| 63-119024 | 5/1988 | Japan | . |
| 2294937 | 12/1990 | Japan | . |
| 3254448 | 11/1991 | Japan | . |

*Primary Examiner*—Paul M. Dzierzynski
*Assistant Examiner*—Don Wong
*Attorney, Agent, or Firm*—Stevens, Davis, Miller & Mosher

[57] ABSTRACT

An optical head for recording and/or reproducing information on and/or from an opto-magnetic record medium including an optical member formed by first and second prisms having parallel opposing surfaces and being joined with each other and having an incident angle on which a beam splitting surface is provided and a polarizing beam splitting plane formed between contact surfaces of the first and second prisms, a laser light source for emitting a laser beam which is made incident upon said beam splitting surface of the optical member, an objective lens for projecting said incident laser beam reflected by said beam splitting surface onto the opto-magnetic record medium and introducing a return laser beam reflected by the opto-magnetic record medium onto the beam splitting surface, and first and second photodetectors for receiving first and second laser beams having mutually orthogonal polarizing directions transmitted through and reflected by said polarizing beam splitting plane, respectively.

24 Claims, 7 Drawing Sheets

FIG_1

FIG_6

FIG_7

FIG_8

FIG_9

FIG_10

OPTICAL HEAD FOR RECORDING AND/OR REPRODUCING INFORMATION ON AND/OR FROM OPTO-MAGNETIC RECORD MEDIUM

Background of the Invention

1. Field of the Invention

The present invention relates to an optical head for recording and/or reproducing information on and/or from an opto-magnetic record medium comprising a laser light source for emitting an incident laser beam, a beam splitting means for splitting the said incident laser beam emitted from the laser light source from a return laser beam reflected by an opto-magnetic record medium, an objective lens for projecting said incident laser beam onto the opto-magnetic record medium and introducing a laser beam reflected by said opto-magnetic record medium as said return laser beam to said beam splitting means, a polarizing beam splitting means for dividing said return laser beam into first and second laser beams having mutually orthogonal directions of polarization, and first and second photodetectors for receiving said first and second laser beams, respectively.

In Japanese Patent Application Laid-open Publication Kokai Hei 2-294937, there is described a known optical head in which an incident light beam to be made incident upon an opto-magnetic record medium is separated from a return light beam reflected by the opto-magnetic record medium by means of a beam splitter, and the return beam is divided into two beams having polarizing directions perpendicular to each other by means of an analyzer which introduces astigmatism to the divided return light beams. The analyzer is constructed by joining two plane parallel plates with each other while a polarizing plane is provided between contact surfaces of the plane parallel plates. The two light beams transmitted through and reflected by the polarizing plane, respectively and emanating from the analyzer are received by respective photodetectors.

In Japanese Patent Application Laid-open Publication Kokai Hei 3-254448, there is proposed another known optical head, in which a beam splitting element is formed by two plane parallel plates which are secured to each other by means of a polarizing beam splitting plane; on one of two surfaces which are parallel with the polarizing beam splitting plane there is provided a half mirror plane and on the other surface there is formed a reflection plane. A laser beam emitted by a laser light source is made incident upon the half mirror surface and a reflected laser beam is projected onto the opto-magnetic record medium by means of the objective lens. The return laser beam reflected by the record medium is made incident upon the half mirror surface and a part of the return laser beam is transmitted therethrough and is made incident upon the polarizing beam splitting plane. A laser beam having a polarizing direction which is reflected by the polarizing beam splitting plane emanates from the beam splitting element at a portion of the incident surface which is not provided with the half mirror coating. A laser beam having a polarizing direction which is transmitted through the polarizing beam splitting surface is reflected by the reflection surface and emanates from incident surface of the beam splitting element at said portion.

In the above mentioned known optical heads, the polarizing beam splitting prism is formed by joining two plane parallel plates with each other, so that the workability of the prism is improved and the manufacturing cost of the prism can be reduced. Furthermore, in the known optical head described in the Japanese Patent Application Laid-open Publication Kokai Hei 3-254448, the plane parallel plates have the function for splitting the incident light beam from the return light beam as well as the function for dividing the return light beam into the orthogonally polarized components, and therefore the whole optical head can be constructed small in size.

However, in the known optical head described in the Japanese Patent Application Laid-open Publication Kokai Hei 3-254448, the return light beam reflected by the opto-magnetic record medium is made incident upon the surface of the beam splitting prism upon which the incident light beam emitted by the light source is also made incident, and thus the return light beam is made incident upon the polarizing beam splitting plane at a small incident angle. For instance, when the plane parallel plates are made of glass having a refractive index of 1.51 and the return light beam is made incident upon the incident surface of the prism at an incident angle of 45°, the incident angle of the return light beam upon the polarizing beam splitting plane is $\sin^{-1}(1.51^{-1} + \sin 45°) \approx 27.9°$. The polarizing beam splitting plane is formed by a multi-layer construction of dielectric films and its function for splitting the polarized beam is dependent upon the incident angle. When the incident angle is small as explained above, it would be very difficult to construct the polarizing beam splitting plane by the multi-layer of dielectric films.

Furthermore, in the known beam splitting prism described in the Japanese Patent Application Laid-open Publication Kokai Hei 3-254448, the surface of the prism is used as the incident surface for the incident light beam as well as the exiting surface of the return light beams, so that the half mirror place has to be locally formed on this surface of the prism. The half mirror surface is formed by depositing a metal such as Cr, and thus the surface has to masked partially. This causes the manufacturing process of the beam splitting prism to be complicated and increases the manufacturing cost of the prism.

Summary of the Invention

The present invention has for its object to provide a novel and useful optical head in which the above mentioned drawbacks of the known optical head can be removed and the optical head can be made simple in construction, small in size and cheap in cost.

According to the invention, an optical head for recording and/or reproducing information on and/or from an opto-magnetic record medium comprises a laser light source for emitting an incident laser beam, a beam splitting means for splitting the said incident laser beam emitted from the laser light source from a return laser beam reflected by an opto-magnetic record medium, an objective lens for projecting said incident laser beam onto the opto-magnetic record medium and introducing a laser beam reflected by said opto-magnetic record medium as said return laser beam to said beam splitting means, a polarizing beam splitting means for dividing said return laser beam into first and second laser beams having mutually orthogonal directions of polarization, and first and second photodetectors for receiving said first and second laser beams, respectively, the improvement being characterized in that said beam splitting means and polarizing beam splitting means comprise an optical member which is composed of first and second prisms which are joined with each other via contact surfaces and each of which has opposing parallel surfaces, and said polarizing beam splitting means is formed between said contact surfaces of the first and second prisms, and said beam splitting means is formed on a surface of said optical member which is not parallel with said polarizing beam splitting plane.

In the optical head according to the invention, the laser beam emitted by the laser light source is projected by the objective lens onto a record plane of the opto-magnetic record medium by means of the beam splitting surface, and the return laser beam reflected by the opto-magnetic record medium is made incident upon the beam splitting surface by means of the objective lens and is separated from the incident laser beam by the beam splitting surface. Then, the return laser beam is made incident upon the polarizing beam splitting plane and is divided into the first and second laser beams which are polarized into mutually orthogonal directions. These first and second laser beams emanate from the beam splitting optical element and are separately received by the first and second photodetectors, respectively. The first and second prisms forming the optical member are shaped to have parallel opposing surfaces, so that they can be manufactured easily. Further, the polarizing beam splitting plane is not parallel with the beam splitting surface, and thus the return laser beam can be made incident upon the polarizing beam splitting plane at a large incident angle. Therefore, the polarizing beam splitting plane can be manufactured easily by coating a plurality of dielectric films.

DESCRIPTION OF THE PREFERRED EMBODIMENTS

Figure 1:
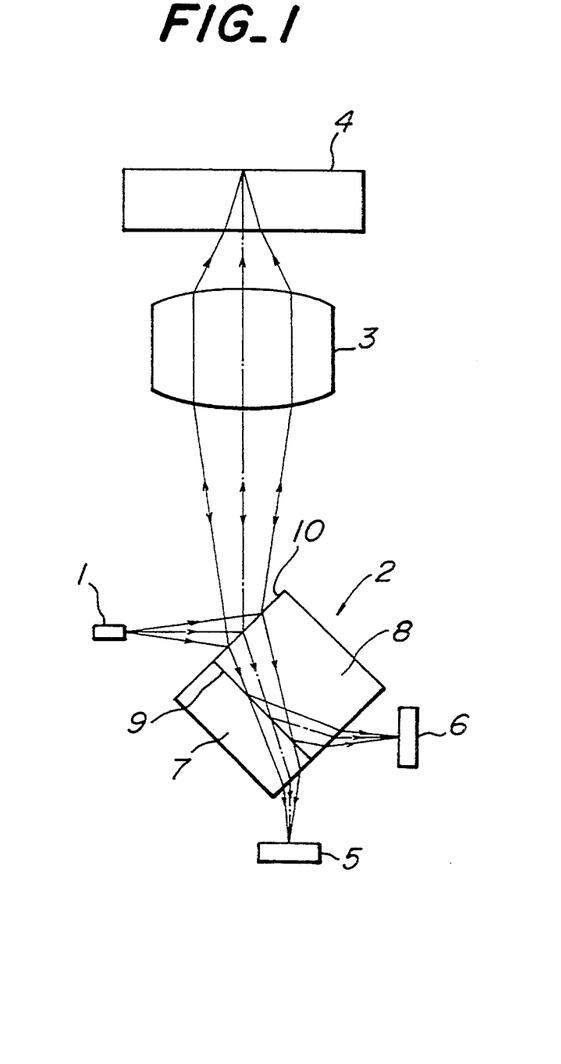
FIG. 1 is a schematic plan view showing a first embodiment of the optical head according to the invention.

FIG. 1 is a schematic plan view showing a first embodiment of the optical head according to the invention. A linearly polarized laser beam emitted by a laser light source 1 is projected onto a record plane of an opto-magnetic record medium 4 by means of an optical member 2 and an objective lens 3 as a very fine spot. A return laser beam reflected by the opto-magnetic record medium 4 is made incident upon a beam splitting surface 10 of the optical member 2 by means of the objective lens 3 and is separated from the incident laser beam. The return laser beam is then made incident upon a polarizing beam splitting plane 9 and is divided into first and second laser beams having mutually orthogonal polarizing directions. Finally the first and second laser beams are received by first and second photodetectors 5 and 6, respectively.

In the present embodiment, the optical member 2 comprises first and second rectangular parallelepiped prisms 7 and 8 made of optical glass having the same refractive index. In each of these prisms 7 and 8, there are three sets of parallel opposing surfaces. The first and second prisms 7 and 8 are joined with each other by means of a multi-layer of dielectric films to form a polarizing beam splitting plane 9 between the contact surfaces. As can be understood from a later explanation, according to the invention, the polarizing beam splitting plane 9 can be simply constructed by coating a plurality of dielectric films on one of the contact surfaces of the first and second rectangular parallelepiped prisms 7 and 8. The beam splitting surface 10 is simply formed by a half mirror surface which is obtained by coating a plurality of dielectric films on an incident surface of the optical member 2 which is not parallel with the contact surfaces of the prisms 7 and 8. It should be noted that the beam splitting surface 10 may be formed only on the incident surface of the second prism before assembling the first and second prisms into to the optical member 2 or alternatively the beam splitting surface 10 may be provided on the incident surfaces of the first and second prisms after joining the first and second prisms.

In the present embodiment, the laser beam emitted by the laser light source 1 is polarized such that a direction of polarization of the incident laser beam is inclined by 45° with respect to a plane of the drawing of FIG. 1, i.e. an incident plane which is perpendicular to the polarizing beam splitting plane 9. It should be noted that according to the invention, although it is preferable to incline the direction of polarization of the incident laser beam with respect to the incident plane by 45°, this inclination angle may be set to 35°–55°. In the present embodiment, the laser light source 1 and optical member 2 are arranged such that the laser beam is made incident upon beam splitting surface 10 of the optical element 2 with an incident angle of 45°. The first photodetector 5 is arranged to receive the first laser beam which is transmitted through the polarizing beam splitting plane 9 and emanates from the first prism 7, and the second photodetector 6 is arranged to receive the second laser beam which is reflected by the polarizing beam splitting plane 9 and emanates from the second prism 8. In the present embodiment, the first and second photodetectors 5 and 6 are arranged to be perpendicular to optical axes of the first and second laser beams, respectively.

Now the operation of the optical head of the present embodiment will be explained. The laser beam emitted by the laser light source 1 is made incident upon the beam splitting surface 10 of the optical member 2 and a part of the incident laser beam is reflected by the beam splitting surface. This laser beam reflected by the beam splitting surface 10 is then projected onto the opto-magnetic record medium 4 by means of the objective lens 3 as a fine spot. The laser beam is then reflected by the opto-magnetic record medium 4 and is made incident upon the beam splitting surface 10 of the optical member 2 by means of the objective lens 3 as the return laser beam. As is well known in the art, the direction of polarization of the return laser beam is rotated by a Kerr rotation angle in a direction depending upon a direction of magnetization recorded on the opto-magnetic record medium. A part of the return laser beam is transmitted through the beam splitting surface 10 and is then made incident upon the polarizing beam splitting plane 9 after being refracted by the incident surface of the optical member 2.

When the return laser beam is made incident upon the polarizing beam splitting plane 9, a P-polarized component, i.e. a polarized component whose electric vector is perpendicular to an incident plane with respect to the polarizing beam splitting plane 9 is substantially transmitted through the polarizing beam splitting plane 9, but an S-polarized component, i.e. a polarized component whose electric vector is parallel with the incident plane is substantially reflected by the polarizing beam splitting plane. The P-polarized component and S-polarized component emanate as the first and second laser beams from exiting surfaces of the first and second prisms 7 and 8, respectively which are parallel with the incident surfaces on which the beam splitting surface 10 is provided. Then the P-polarized first laser beam and S-polarized second laser beam are received by the first and second photodetectors 5 and 6, respectively. Therefore, an information signal is derived as a difference between outputs of the first and second photodetectors 5 and 6. Furthermore, focusing error signal and tracking error signal may be derived from the outputs of the photodetectors 5 and 6 in accordance with a known astigmatism method and pushpull method, respectively.

In the present embodiment, the return laser beam reflected by the opto-magnetic record medium 4 is made incident upon the beam splitting surface 10 at an incident angle of 45° and a part of the incident laser beam is transmitted through the beam splitting surface 10 is refracted by the incident surface of the prism 8. Then, the laser beam is made incident upon the polarizing beam splitting plane 9. It should be noted that the polarizing beam splitting plane 9 is not parallel with the beam splitting surface 10, but is perpendicular to the beam splitting surface 10, and thus the incident angle of the laser beam upon the polarizing beam splitting plane 9 becomes large. For instance, when the prisms 7 and 8 are made of glass having a refractive index of 1.51, the incident angle becomes $90° - \sin^{-1}(1.51^{-1} \cdot \sin 45°) \approx 62.1°$. Therefore, the polarizing beam splitting plane 9 can be simply formed by a multi-layer construction of dielectric films. As stated above, each of the first and second prisms 7 and 8 is construction to have parallel opposing surfaces and the polarizing beam splitting plane 9 is formed by the multi-layer of dielectric films, and therefore the optical element 2 can be manufactured simply at a low cost.

Figure 2:
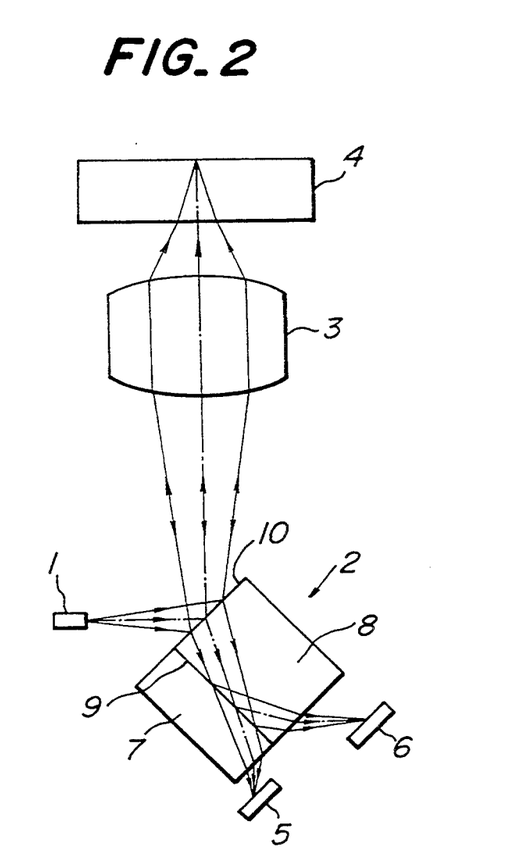
FIG. 2 is a schematic plan view illustrating a second embodiment of the optical head according to the invention.

FIG. 2 is a schematic plan view showing a second embodiment of the optical head according to the invention. In the first embodiment shown in FIG. 1, the first and second photodetectors 5 and 6 are arranged perpendicular to central rays of the first and second laser beams, respectively, so that the first and second photodetectors are not parallel with the exiting surface of the optical member 2. In the present embodiment, these photodetectors 5 and 6 are arranged to be parallel with the exiting surface of the optical member 2 which is opposed to the photodetectors 5 and 6. The remaining construction of the optical head of the present embodiment is same as that of the first embodiment. In the second embodiment of the optical head according to the invention, the arrangement and adjustment of the photodetectors 5 and 6 with respect to the optical member 2 can be much simpler and supporting members for securing the photodetectors 5 and 6 to a housing of the optical head can be simple.

Figure 3:
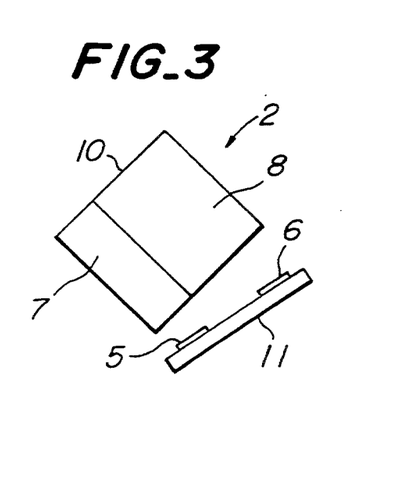
FIG. 3 is a schematic plan view depicting a portion of a third embodiment of the optical head according to the invention.

FIG. 3 is a schematic plan view depicting the optical member of a third embodiment of the optical head according to the invention. In the present embodiment, the first and second photodetectors 5 and 6 are provided on a single plate-like substrate 11. Then, the arrangement and adjustment can be further simplified and the substrate can be secured to the housing of the optical head by means of a much simpler supporting member in a much simpler manner.

Figure 4:
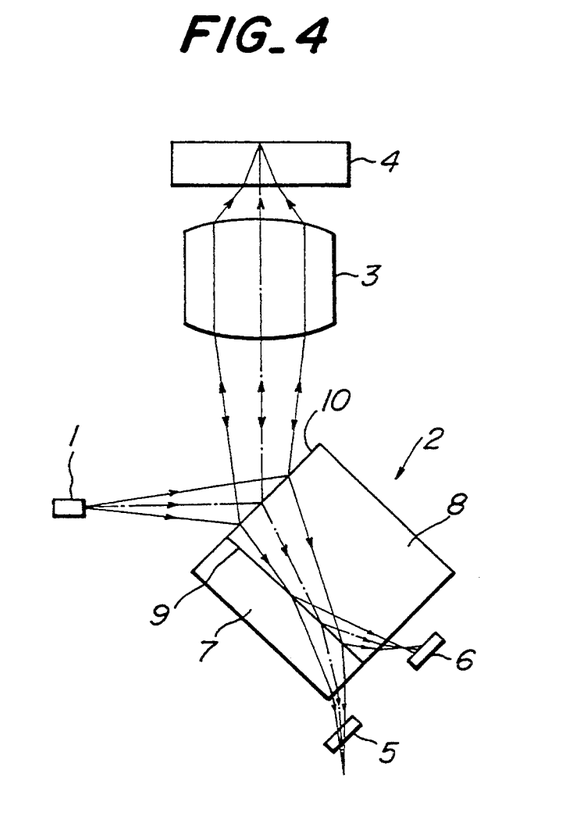
FIG. 4 is a schematic plan view representing a fourth embodiment of the optical head according to the invention.

FIG. 4 is a schematic plan view showing a fourth embodiment of the optical head according to the invention. In the present embodiment, the first and second prisms 7 and 8 are made of optical materials having different refractive indices, so that the first and second photodetectors 5 and 6 are arranged on the same plane. Then, it is possible to give a difference in an optical path length of the first and second laser beams, and therefore the focusing error signal can be derived by the beam size method. That is to say, the first beam is focused at a point behind the first photodetector 5 and the second laser beam is focused at a point in front of the second photodetector 6 as illustrated in FIG. 4. Since the photodetectors 5 and 6 are arranged on the same plane, they can be easily secured to the housing of the optical head.

Figure 5:
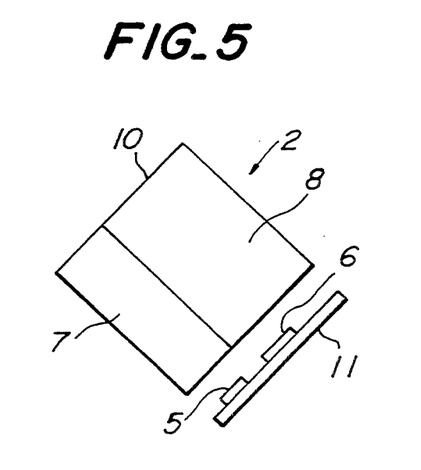
FIG. 5 is a schematic plan view illustrating a portion of a fifth embodiment of the optical head according to the invention.

FIG. 5 is a schematic plan view illustrating a fifth embodiment of the optical head according to the invention. In the present embodiment, the first and second rectangular parallelepiped prisms 7 and 8 are made of optical material having different refractive indices and the first and second photodetectors 5 and 6 are arranged on the same plate-like substrate 11 which is arranged in parallel with the exiting surface of the optical member 2. That is to say, similar to the fourth embodiment, the refractive indices of the first and second prisms 7 and 8 are different from each other such that the optical path lengths of the first and second laser beams are different from each other. Therefore, although the substrate 11 is arranged in parallel with the exiting surface of the optical member 2, the first and second laser beams can be focused at points behind and in front of the photodetectors 5 and 6, respectively.

In the present embodiment, as compared with the third embodiment in which the difference in the optical path length is achieved by arranging the substrate 11 not in parallel with the opposite surface of the optical member 2, the substrate 11 can be arranged closer to the optical member 2, so that the substrate can be easily secured to the housing of the optical head by means of a much simpler supporting member.

Figure 6:
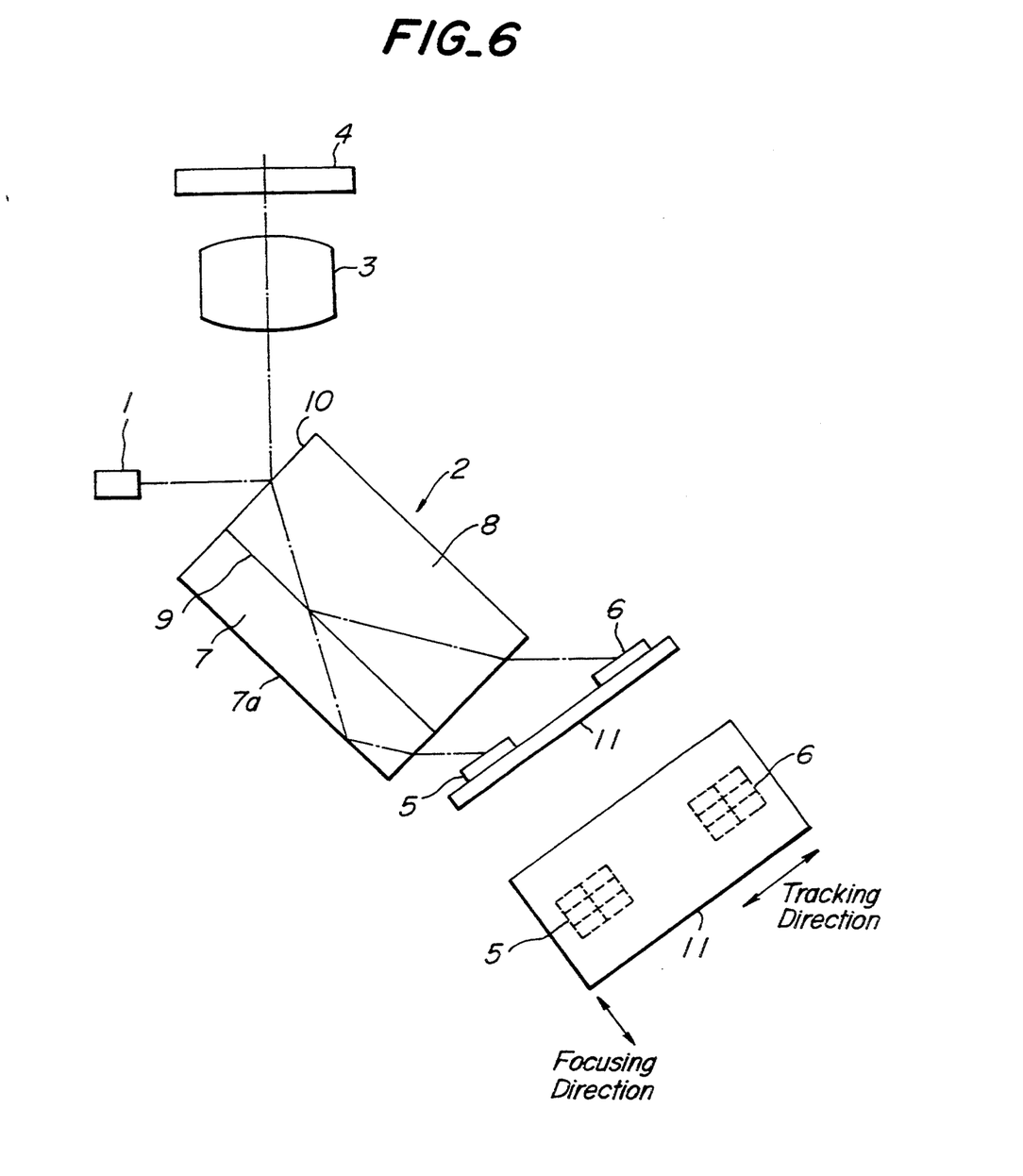
FIG. 6 is a schematic plan view showing sixth embodiment of the optical head according to the invention.
Figure 7:
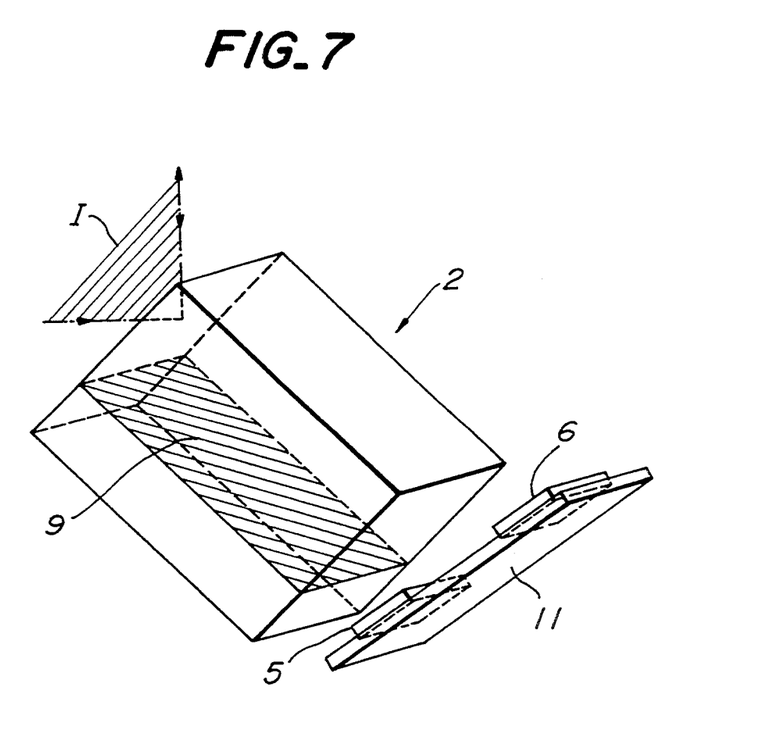
FIG. 7 is a schematic perspective view depicting a portion of a seventh embodiment of the optical head according to the invention.

FIG. 6 is a schematic plan view showing a sixth embodiment of the optical head according to the invention and FIG. 7 is a perspective view depicting the optical member and photodetectors. In the present embodiment, the first laser beam, i.e. the P-polarized component of the return beam transmitted through the polarizing beam splitting plane 9 is reflected by a surface 7a of the first prism 7 opposing to the polarizing beam splitting plane 9 and then emanates from the exiting surface of the first prism opposing to the beam splitting surface 10. As shown in FIG. 6, each of the first and second photodetectors 5 and 6 comprises six light receiving regions which are divided along the focusing and tracking directions. The first and second photodetectors 5 and 6 are arranged on the same substrate 11, and the substrate is arranged to be inclined with respect to the exiting surface of the optical member 2 such that the first laser beam is focused at a point behind the first photodetector 5 and the second laser beam is focused at a point in front of the second photodetector 6, so that the focusing error signal is derived by processing the outputs of the first and second photodetectors 5 and 6 by the beam size method and the tracking error signal is derived by the push-pull method. As shown in FIG. 7, the incident plane I to the beam splitting surface 10 is perpendicular to the polarizing beam splitting plane 9. It should be noted that this positional relationship between the incident plane and the polarizing beam splitting plane 9 is also adopted in the previous embodiments shown in FIGS. 1 to 5.

Figure 8:
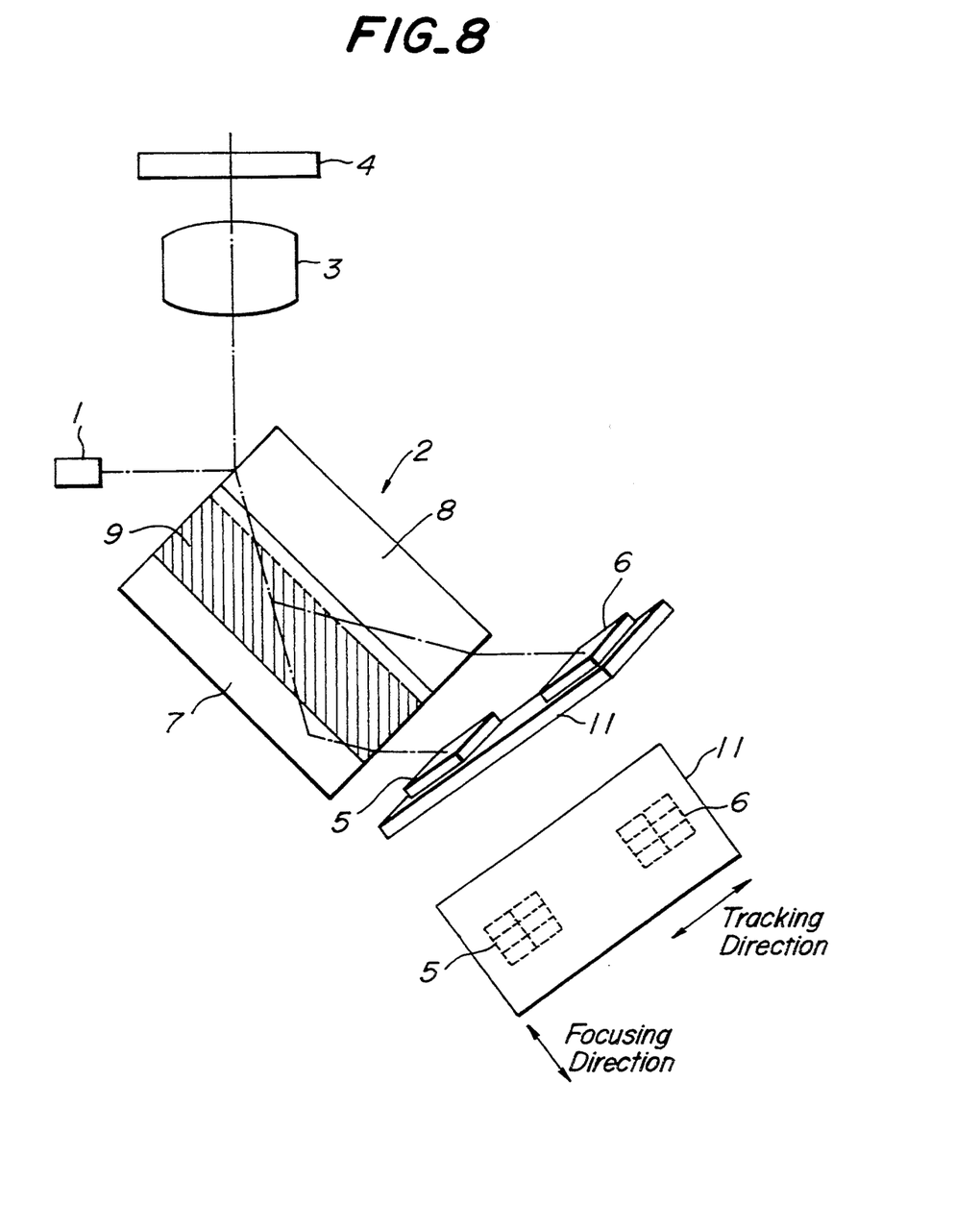
FIG. 8 is a schematic plan view showing a whole construction of seventh embodiment of the optical head according to the invention.

FIG. 8 is a schematic plan view showing a seventh embodiment of the optical head according to the invention. In the present embodiment, the direction of polarization of the incident laser beam emitted by the laser light source 1 is parallel with or perpendicular to the plane of the drawing of FIG. 8, and the optical member 2 is rotated by 45° about an axis which is perpendicular to the beam splitting surface 10. Therefore, the direction of polarization of the incident laser beam is parallel with or perpendicular to the incident plane of the return laser beam upon the polarizing beam splitting plane 9. The remaining construction is same as that of the sixth embodiment shown in FIG. 6. In FIG. 8, the polarizing beam splitting plane 9 is denoted with hatching for the sake of clarity.

In the present embodiment, the first and second photodetectors 5 and 6 can be arranged on the same substrate 11 such that dividing lines of the first and second photodetectors extending in the tracking direction can be aligned. Therefore, the substrate 11 can be simply positioned with respect to the optical member 2 merely by adjusting it in the focusing and tracking directions.

The present invention is not limited to the above explained explained embodiments, but many modifications and alternations may be conceived by those skilled in the art within the scope of the invention. For instance, in the first to sixth embodiments, the direction of polarization of the incident laser beam is inclined by 45° with respect to the incident plane, but according to the invention the direction of polarization of the incident laser beam may be set to be parallel with or perpendicular to the incident plane. In this case, the optical member 2 is rotated by 35° to 55° about an axis perpendicular to the beam splitting surface 10 and the photodetector 6 has to be positioned to receive the S-polarized component.

Furthermore, in the above embodiments, the optical member 2 is formed by the two rectangular parallelepiped prisms 7 and 8, but it may be constructed any other prisms whose opposing surfaces are parallel with each other.

Figure 9:
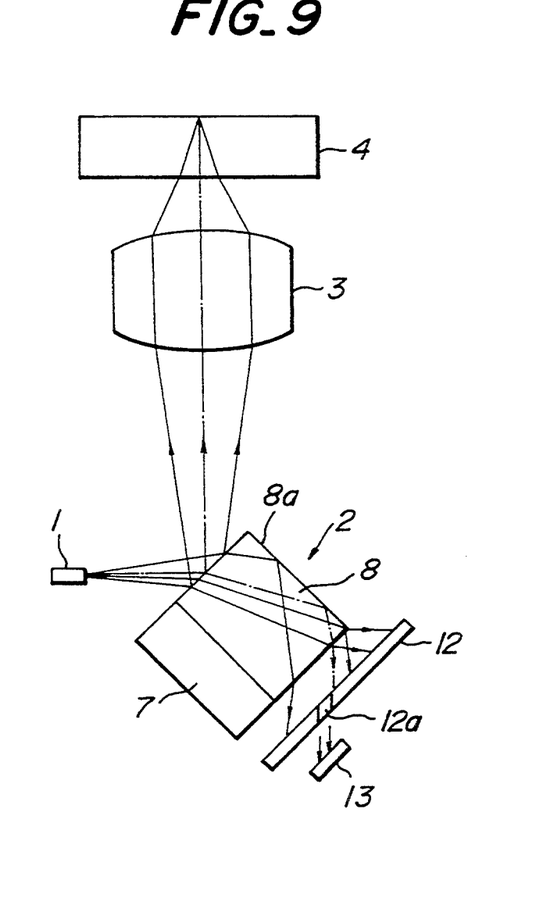
FIG. 9 is a schematic plan view illustrating a eighth embodiment of the optical head according to the invention.
Figure 10:
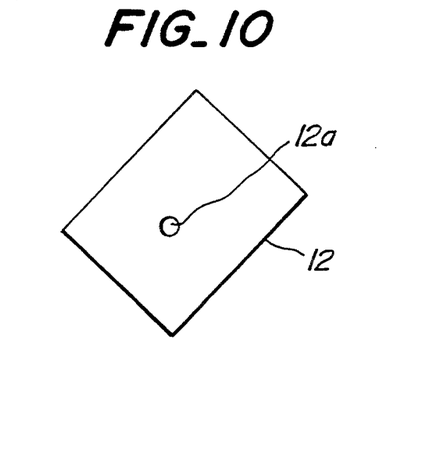
FIG. 10 is a plan view representing a stop plate shown in FIG. 9.

In the above explained embodiments, a part of the incident laser beam is transmitted through the beam splitting surface 10 and is reflected by a surface 8a of the prism 8 which is parallel with the polarizing beam splitting surface 9 as shown in FIG. 9, and then the thus reflected laser beam emanates from the prism 8. A part of the thus emanating laser beam is received by a third photodetector 13 through a stop plate 12 having an aperture 12a as shown in FIG. 10. Then the intensity of the laser beam emitted by the laser light source 1 can be controlled by an output of the third photodetector 13.

Further, in an alternative embodiment of the optical head shown in FIG. 9, there are formed two further apertures in the stop plate 12 for passing the first and second laser beams and the first and second laser beams are received by the first and second photodetectors 5 and 6, respectively as shown in FIGS. 1–6 and 8. Moreover, in the embodiment illustrated in FIG. 9, the third photodetector 13 may be provided on the same substrate 11 on which the first and second photodetectors 5 and 6 are arranged.

It should be noted that upon controlling the intensity of the laser beam emitted by the laser light source, it is not always necessary to provide the stop plate 12. This stop plate 12 may be deleted as long as the detection of mutually orthogonally polarized first and second return laser beams by the first and second photodetectors 5 and 6 is not affected.

As explained above in detail, in the optical head according to the invention, the beam splitting function and polarizing beam splitting function are performed by the optical member which is formed by joining the first and second prisms each having parallel opposing surfaces, so that the optical member can be manufactured easily and less expensively and can be made small in size like as the plane parallel plate. Further, the beam splitting surface for splitting the incident laser beam and return laser beam from each other and the polarizing beam splitting plane for dividing the return laser beam into the mutually orthogonally polarized components are set to be not parallel with each other, and thus the incident angle of the return laser beam upon the polarizing beam splitting plane can be larger. Therefore, the polarizing beam splitting plane can be easily formed by the multi-layer coating of dielectric films.

In the above embodiments, the beam splitting surface 10 is sufficient for performing only the beam splitting function, and therefore the beam splitting surface can be simply formed on the incident surface of the optical member or the incident surface of the second prism without using a special mask.

What is claimed is:

1. An optical head for recording and/or reproducing information on and/or from an opto-magnetic record medium comprising:
    a laser light source for emitting an incident laser beam;
    a beam splitting means for splitting said incident laser beam emitted from the laser light source from a return laser beam reflected by the opto-magnetic record medium;
    an objective leans for projecting said incident laser beam onto the opto-magnetic record medium and introducing said return laser beam reflected by said opto-magnetic record medium onto said beam splitting means;
    a polarizing beam splitting means for dividing said return laser beam into first and second laser beams having mutually orthogonal directions of polarization;
    first and second photodetectors for receiving said first and second laser beams, respectively; and an optical member which comprises said beam splitting means and said polarizing beam splitting means, said optical member comprising first and second prisms which are joined with each other via contact surfaces, each of said first and second prisms having opposing parallel surfaces, and wherein said polarizing beam splitting means comprises a polarizing beam splitting plane formed between said contact surfaces of the first and second prisms, and said beam splitting means comprises a beam splitting surface formed on a surface of said optical member which is not parallel with said polarizing beam splitting plane.

2. An optical head according to claim 1, wherein each of said first and second prisms is formed by a rectangular parallelepipied prism having three sets of parallel opposing surfaces.

3. An optical head according to claim 1, wherein said first and second prisms are made of optical materials having the same refractive index.

4. An optical head according to claim 1, wherein said first and second prisms are made of optical materials having different refractive indices.

5. An optical head according to claim 1, wherein said beam splitting surface is formed by a half mirror surface applied on said surface of the optical member.

6. An optical head according to claim 1, wherein said polarizing beam splitting plane is formed by a multilayer of dielectric films.

7. An optical head according to claim 1, wherein said incident laser beam is polarized in a direction which is inclined by 35°–55° with respect to an incident plane, and said polarizing beam splitting plane is set to be perpendicular to said incident plane.

8. An optical head according to claim 7, wherein said incident laser beam is made incident upon said beam splitting surface at an incident angle of 45°.

9. An optical head according to claim 1, wherein said first and second laser beams emanate from an exiting surface of the optical member which is opposed to said beam splitting surface.

10. An optical head according to claim 9, wherein said first and second photodetectors are arranged to be perpendicular to optical axes of the first and second laser beams, respectively.

11. An optical head according to claim 9, wherein said first and second photodetectors are arranged to be parallel with said exiting surface of the optical member from which said first and second laser beams emanate.

12. An optical head according to claim 9, wherein said first and second photodetectors are arranged on a single plate-like substrate.

13. An optical head according to claim 12, wherein said plate-like substrate is arranged to be inclined with respect to said exiting surface of the optical member.

14. An optical head according to claim 12, wherein said plate-like substrate is arranged to be parallel with said exiting surface of the optical member.

15. An optical head according to claim 12, wherein said first and second prisms of the optical member are made of optical materials having different refractive indices.

16. An optical head according to claim 9, wherein said first laser beam which is transmitted through said polarizing beam splitting plane is reflected by a surface of the first prism which is parallel with the polarizing beam splitting plane.

17. An optical head according to claim 1, wherein at least one of said first and second photodetectors comprises at least two light receiving regions which are divided along a line extending in parallel with an information track on the opto-magnetic record medium.

18. An optical head according to claim 1, wherein at least one of said first and second photodetectors comprises at least two light receiving regions which are divided along a line extending in a direction perpendicular to an information track on the optomagnetic record medium.

19. An optical head according to claim 1, wherein said incident laser beam is polarized in a direction which is parallel with or perpendicular to an incident plane of said incident laser beam, and said polarizing beam splitting plane is set to be inclined by 35°–55° with respect to said incident plane.

20. An optical head according to claim 19, wherein said incident laser beam is made incident upon said beam splitting surface at an incident angle of 45°.

21. An optical head according to claim 1, wherein said optical head further comprises a third photodetector for receiving a part of said incident laser beam which is transmitted through said beam splitting surface and then is tranmitted through an exiting surface of said optical member which is opposing to said polarizing beam splitting plane.

22. An optical head according to claim 21, wherein said optical head comprises a stop plate arranged between said optical member and said third photodetector and having an aperture formed therein, said third photodetector receiving said part of the incident laser beam through said aperture.

23. An optical head according to claim 21, wherein a power of the laser beam emitted by said laser light source is controlled in accordance with an output of said third photodetector.

24. An optical head according to claim 14, wherein said first and second prisms of the optical member are made of optical materials having different refractive indices.

* * * * *